United States Patent [19]
Wilson et al.

[11] Patent Number: 5,706,199
[45] Date of Patent: Jan. 6, 1998

[54] SYSTEM FOR CONTROLLING ENGINE SPEED IN RESPONSE TO DETECTION OF VEHICLE SPEED SIGNAL TAMPERING

[75] Inventors: Mark L. Wilson; Anthony W. Williams, both of Columbus; Jon E. Krutulis, Greenwood; Andrew J. Pajakowski, Columbus, all of Ind.

[73] Assignee: Cummins Engine Company, Inc., Columbus, Ind.

[21] Appl. No.: 503,163

[22] Filed: Jul. 17, 1995

[51] Int. Cl.$^6$ .................................................. B60K 31/16
[52] U.S. Cl. ............................. 364/426.041; 364/424.04; 180/173; 340/438
[58] Field of Search ............... 364/424.034, 424.04, 364/426.041, 426.043, 424.083; 377/24; 235/30 A, 30 R; 123/350, 351, 358, 363, 466; 180/287, 170, 171, 173, 179; 340/426, 438

[56] References Cited

U.S. PATENT DOCUMENTS

| | | | |
|---|---|---|---|
| 3,809,312 | 5/1974 | Warrick et al. | 235/30 R |
| 3,893,441 | 7/1975 | Hebb, Jr. et al. | 123/363 |
| 4,217,484 | 8/1980 | Gerst | 377/24 |
| 4,236,142 | 11/1980 | Lindsey | 180/287 |
| 4,294,204 | 10/1981 | Humer | 123/358 |
| 4,559,637 | 12/1985 | Weber | 377/24 |
| 4,564,916 | 1/1986 | Hori et al. | 123/198 D |
| 4,612,623 | 9/1986 | Bazarnik | 377/20 |
| 4,905,785 | 3/1990 | Kieffer et al. | 180/179 |
| 5,047,944 | 9/1991 | Ishikawa et al. | 364/424.04 |
| 5,303,163 | 4/1994 | Ebaugh et al. | 364/424.04 |
| 5,586,130 | 12/1996 | Doyle | 364/424.04 |

*Primary Examiner*—Gary Chin
*Attorney, Agent, or Firm*—Woodard, Emhardt, Naughton, Moriarty & McNett

[57] ABSTRACT

The present invention is directed to a system for detecting the tampering of the vehicle speed signal in a vehicle having electronic engine control. An algorithm that forms part of the present invention is operable to detect a tampering mode producing a constant transmission out-of-gear signal to the vehicle speed sensor input of the electronic controller, and tampering mode disallowing the electronic controller from acting upon a vehicle owner or manager-programmed top gear ratio, or maximum vehicle speed limit. In response to detecting a possible vehicle speed signal tampering condition, a vehicle speed signal tampering fault code is logged into a memory portion of the controller, a vehicle operator warning lamp is activated and the engine speed is electronically controlled to a vehicle owner/manager programmable maximum engine speed limit. The system is operable with a number of transmission embodiments including manual and automatic types intended for either on or on/off highway applications.

37 Claims, 6 Drawing Sheets

SYSTEM FOR CONTROLLING ENGINE SPEED IN RESPONSE TO DETECTION OF VEHICLE SPEED SIGNAL TAMPERING

FIELD OF THE INVENTION

This invention relates in general to systems for detecting vehicle speed signal tampering, and more specifically to systems for limiting engine speed to a programmable RPM level in response to detecting such vehicle speed signal tampering.

BACKGROUND OF THE INVENTION

In vehicles having a road speed governor for electronically controlling the speed of an internal combustion engine to thereby limit vehicle speed, it is not uncommon for operators of such vehicles to tamper with the vehicle speed sensor, or its signal wires, in an effort to defeat the road speed governor. Doing so permits the operator to operate the vehicle at speeds higher than that which would have previously been allowed by the road speed governor. Often times, such a vehicle is owned by a business entity and operated by an operator employed by the entity. In such a situation, as is common in the tractor-truck/trailer industry, the vehicle owner typically "programs" the road speed governor, or otherwise provides the governor with a maximum vehicle speed, so that the employee/operator cannot exceed an established maximum vehicle speed.

As used herein, the term "vehicle speed signal tampering" is thus defined in a broad sense as any attempt at defeating a feature of the electronic engine control relating to vehicle speed, and more specifically as any alteration of the vehicle speed signal to thereby permit a vehicle to operate outside the bounds of predefined speed limits by defeating the road speed governor. Several methods of tampering with a vehicle speed signal are known to exist. For example, one type of tampering mode causes the electronic controller to detect constant or intermittent out-of-gear conditions. Another type of tampering mode keeps the electronic controller from sensing either a programmed top gear ratio or maximum vehicle speed limit. In either case, the vehicle operator may successfully defeat the road speed governor to thereby operate the vehicle at speeds higher than that allowable by the road speed governor under normal conditions.

By so defeating the road speed governor, the vehicle operator may operate the vehicle at speeds higher than that desired by the vehicle owner or maintenance personnel, thus resulting in reduced fuel economy, possible vehicle speed violations, unsafe vehicle operation and potential damage to public reputation. What is therefore needed is an arrangement for detecting at least some of the various known modes of vehicle speed signal tampering. Such an arrangement should not only reliably detect vehicle speed signal tampering, but should further limit the engine speed to an owner-programmable maximum engine speed in response thereto. Ideally, such an arrangement should further be easily incorporated into existing electronically controlled vehicles.

SUMMARY OF THE INVENTION

The foregoing vehicle speed signal tampering problems are addressed by the present invention. According to one aspect of the present invention, a method of detecting vehicle speed signal tampering in a vehicle having an engine, a transmission having a plurality of gears, a vehicle speed sensor for sensing vehicle speed and providing a vehicle speed signal corresponding thereto, an engine speed sensor for sensing engine speed and providing an engine speed signal corresponding thereto, and an electronic engine controller having a memory associated therewith, comprises the steps of: (1) monitoring the vehicle speed signal and the engine speed signal and determining therefrom whether a constant transmission out of gear condition exists; (2) logging an active vehicle speed signal fault code within the memory if said constant out of gear condition exists for at least a first time period; and (3) electronically controlling the engine speed to a predefined maximum engine speed in response to logging said active vehicle speed signal fault code.

According to another aspect of the present invention, a method of detecting vehicle speed signal tampering in a vehicle having an engine, a transmission having a plurality of gears, a vehicle speed sensor for sensing vehicle speed and providing a vehicle speed signal corresponding thereto, an engine speed sensor for sensing engine speed and providing an engine speed signal corresponding thereto, and an electronic engine controller having a memory associated therewith, comprises the steps of: (1) monitoring the vehicle speed signal and the engine speed signal and determining therefrom a transmission gear ratio; (2) logging an active vehicle speed signal fault code within the memory if said transmission gear ratio exceeds a predefined top gear ratio by at least a predetermined percentage of said predefined top gear ratio for a first time period; and (3) electronically controlling the engine speed to a predefined maximum engine speed in response to logging said active vehicle speed signal fault code.

According to a further aspect of the present invention, a method of detecting vehicle speed signal tampering in a vehicle having an engine, a transmission having a plurality of gears, a vehicle speed sensor for sensing vehicle speed and providing a vehicle speed signal corresponding thereto, an engine speed sensor for sensing engine speed and providing an engine speed signal corresponding thereto, and an electronic engine controller having a memory associated therewith, comprises the steps of: (1) periodically sensing the vehicle and engine speed signals and determining therefrom a transmission gear ratio; (2) comparing the transmission gear ratio with the previously determined transmission gear ratio; (3) comparing vehicle speed with the previously sensed vehicle speed; (4) logging an active vehicle speed signal fault code within the memory if, for at least a first time period, the transmission gear ratio deviates from the previously determined transmission gear ratio by more than a gear ratio threshold value and the vehicle speed does not deviate from the previously sensed vehicle speed by more than a vehicle speed threshold value; and (5) electronically controlling the engine speed to a predefined maximum engine speed in response to logging the active vehicle speed signal fault code.

One object of the present invention is to provide a vehicle speed signal anti-tampering system to address various vehicle speed signal tampering modes.

Another object of the present invention is to provide a vehicle speed signal anti-tampering system wherein a vehicle speed signal tampering fault is logged into memory, a warning lamp is activated and the engine speed is limited to a maximum engine speed value in response to detecting a possible tampering condition.

A further object of the present invention is to provide vehicle speed signal anti-tampering system wherein a detected vehicle speed signal tampering condition may only be cleared after a predetermined time period has expired after stopping the vehicle and turning off the engine.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
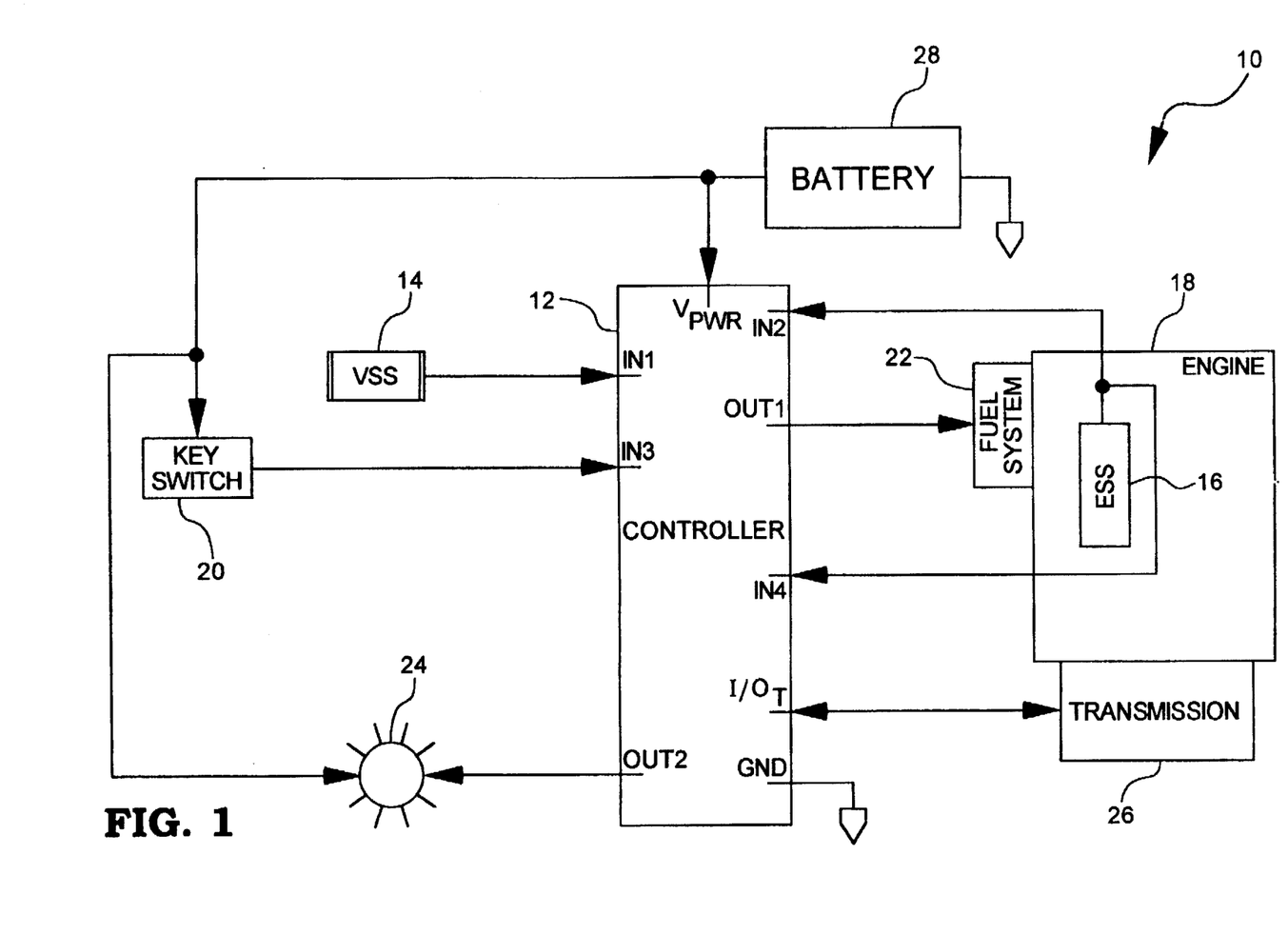
FIG. 1 is a block diagram illustration of a vehicle speed signal tampering detection system in accordance with the present invention.

Referring to FIG. 1, a diagrammatic illustration of a microprocessor controlled vehicle speed signal tampering detection system 10, in accordance with a preferred embodiment of the present invention, is shown. The system 10 includes as its central component a controller 12. Controller 12 is a microcomputer including at least a memory portion and a microprocessor portion operable to run software routines resident within memory, and to manage the overall operation of the system 10. In a preferred embodiment, controller 12 is an electronic control module (ECM) of known construction and commonly used within the automotive and heavy duty truck industry.

The memory portion of controller 12 may include ROM, RAM, EPROM, EEPROM, Flash PROM and any other reusable type of memory known to those skilled in the art. The memory portion of controller 12 may be further supplemented by external memory connected thereto (not shown). The external memory may include any of the memory features described with respect to the controller memory portion. An external memory may also be used to supplant the memory portion of controller 12 if controller 12 lacks such a memory portion, or if the memory portion provides inadequate storage. Finally, the microprocessor portion may include sufficient memory (including ROM and RAM) to obviate the need for an additional controller memory portion or external supplemental memory.

Controller 12 receives electrical power at input $V_{PWR}$ from a battery 28 either directly as shown, in which case controller 12 includes a voltage regulator portion therein, or via an external voltage regulator connected to the battery 28 (not shown). In either case, a voltage regulating function is typically provided to supply the microprocessor portion of controller 12 with an appropriate power level for logic-level operation.

Battery 28 further provides battery voltage to key switch 20 and a driver warning device 24. Driver warning device 24 is, in turn, connected to output OUT2 of controller 12. Driver warning device 24 is preferably a lamp, the function of which will be more fully discussed hereinafter, and should be positioned such that it may be viewed by the driver when operating the vehicle. Preferably, lamp 24 is mounted on or near the instrument panel of the vehicle. Although the preferred embodiment of driver warning device 24 is a lamp, driver warning device 24 may be any device suitable for providing a warning to the vehicle operator of a detected event. The present invention thus contemplates that driver warning device 24 may include any visually illuminating device, flashing or otherwise, such as a lamp, led, fiber optic system or the like, or any audible alarm such as a buzzer, bell, horn, recorded or synthesized voice, or the like.

Typically, battery voltage is approximately 12-14 volts, but the system 10 of the present invention must be operable with battery voltages as low as 7 volts and as high as 32 volts. Key switch 20 is preferably a two-position switch, as typically used in the diesel industry, and has an "off" position and an "on" position. A separate starter switch (not shown) is typically provided to thereby permit the vehicle operator to start the engine. In the "off" position, key switch 20 disconnects the switched battery voltage signal from the controller 12, and in the "on" position, key switch 20 supplies the switched battery voltage signal to the controller 12. The two key positions, or states, described above for key switch 20 correspond to those normally associated with the operation of a diesel engine wherein the key switch is initially switched from the "off" position to the "on" position to supply power to the electrical system of a vehicle. When the starter switch (not shown) is thereafter actuated, a starter solenoid of the vehicle (not shown) is engaged to start the engine 18. Although the key switch 20 just described is used in a preferred embodiment, the present invention contemplates other switch means for accomplishing the key switch function. For example, a "software key", or software controlled system, may be used to actuate a system of relays or other switches in order to supply battery voltage to the necessary electrical components.

In addition to the switched battery voltage supplied to the controller 12 through the key switch 20, signals corresponding to vehicle speed, engine speed, engine fueling and transmission status are supplied to inputs of controller 12.

An engine speed sensor 16 provides an engine speed signal to controller 12 at input IN2. Engine speed sensor 16 is preferably a variable reluctance engine speed/position sensor positioned in close proximity to a toothed gear rotating in synchronism with the camshaft (not shown). In such an engine speed sensing system, a plurality of teeth are typically positioned equiangularly about the gear, and an additional tooth is mechanically synchronized with top dead center of a particular cylinder of the engine. In operation, engine speed/position sensor 16 detects the passage of teeth thereby and provides a corresponding signal to controller 12. Controller 12 then computes engine speed from the engine speed signal, and further computes engine position based on the passage of the added tooth by the engine speed/position sensor 16, as is known in the art. Such an engine speed/position sensor 16 is described in detail in U.S. Pat. No.

5,165,271 entitled SINGLE SENSOR APPARATUS AND METHOD FOR DETECTING ENGINE SPEED AND POSITION, issued to Mark R. Stepper et al. and assigned to the assignee of the present invention, the contents of which are incorporated herein by reference. However, the present invention further contemplates using other engine speed sensing systems such as one having non-equiangular sensing targets, for example.

A vehicle speed sensor 14 provides a vehicle speed signal to input IN1 of controller 12. As with engine speed sensor 16, vehicle speed sensor 14 is preferably a variable reluctance sensor which senses rotational speed of a gear, or tone wheel, connected to the vehicle tail shaft, for example. In any event, engine speed sensor 16 and vehicle speed sensor 14 are preferably analog sensors and thereby provide analog signals to controller 12. Controller 12 preferably includes a zero-crossing detector (not shown) for receiving the analog engine speed and vehicle speed signals, and converting them to signals appropriate for use by the microprocessor portion of controller 12. However, the present invention further contemplates that the engine speed signal and vehicle speed signal may be received by an analog-to-digital convertor portion of controller 12 (not shown) to convert the signals to digital signals usable by the microprocessor portion of controller 12. Alternatively, one or more analog-to-digital convertors may be provided external to controller 12 for converting the sensor signals to digital signals.

Although sensors 14 and 16 are preferably analog sensors known in the automotive and heavy duty truck industry, the present invention also contemplates using sensors that supply digital signals corresponding to the sensed parameter in order to accomplish the above-described functions. The present invention further contemplates using redundant sensors within the system 10 so that the system 10 may remain fully operational while awaiting service on the failed or faulty sensor.

A fuel control system portion of controller 12 provides fuel signals to fuel system 22 to thereby control fuel injection quantities as well as timing of fuel injection into engine 18. As is typical within the diesel engine industry, controller 12 includes a proportional-integral-derivative (PID) portion which, together with fuel system 22 and engine speed sensor 16, forms a fuel control system. In operation, controller 12 typically provides a road speed governing function by supplying the PID portion with a fuel command input signal corresponding to the difference between a "reference speed" signal and the vehicle speed signal. The PID, in turn, provides an appropriate fueling signal at OUT1 to the fuel system 22. The operation of such a fuel control system is well known in the automotive and heavy duty truck industry. Additionally, controller 12 further includes a power take off (PTO) portion for controlling engine speed under certain load conditions as is known in the diesel engine industry.

Finally, the vehicle transmission 26, is structurally connected to the engine 18 in a known manner, and may communicate with controller 12 via input/output port I/O$_T$. Transmission 26 may be one of several transmission embodiments contemplated by the present invention. For example, transmission 26 may be an automatic or manual-automatic transmission having a plurality of electronically controllable transmission gears. Transmission 26 may further be a manual transmission strictly intended for on highway use, or may be a manual transmission intended for both on and off highway use. It is to be understood that the term "manual transmission" used herein is intended to include a manual-automatic transmission, wherein such a manual-automatic transmission includes a number of manually selectible gears as well as a number of automatically selectible gears. In any case, controller 12 may, in some transmission embodiments, provide transmission operational signals via the I/O$_T$ port, and transmission 26 may similarly provide controller 12 with transmission status signals via the I/O$_T$ port.

In operation, the system 10 executes a software program several times a second, preferably every 100 milliseconds, to perform a vehicle speed signal tampering test in accordance with the present invention. When enabled, the program will execute various "Feature Set" subroutines depending on the type of application. For example, if the vehicle is equipped with an automatic transmission, then a Feature Set B subroutine will be executed. On the other hand, if the vehicle is equipped with a manual transmission and is an on highway application, then Feature Set A, B and C subroutines will be executed. Finally, if the vehicle is equipped with a manual transmission and is an on/off highway application, then Feature Set A and C subroutines will be executed. Each of the Feature Set A, B and C subroutines will be discussed in greater detail hereinafter. Regardless of the Feature Set subroutine(s) executed, if a tampering fault is detected, controller 12 is operable to log an active vehicle speed signal tampering (VSST) fault code within memory, limit the engine speed to a programmable engine speed (ES$_{MAX}$), and activate the driver warning lamp 24.

Figure 2:
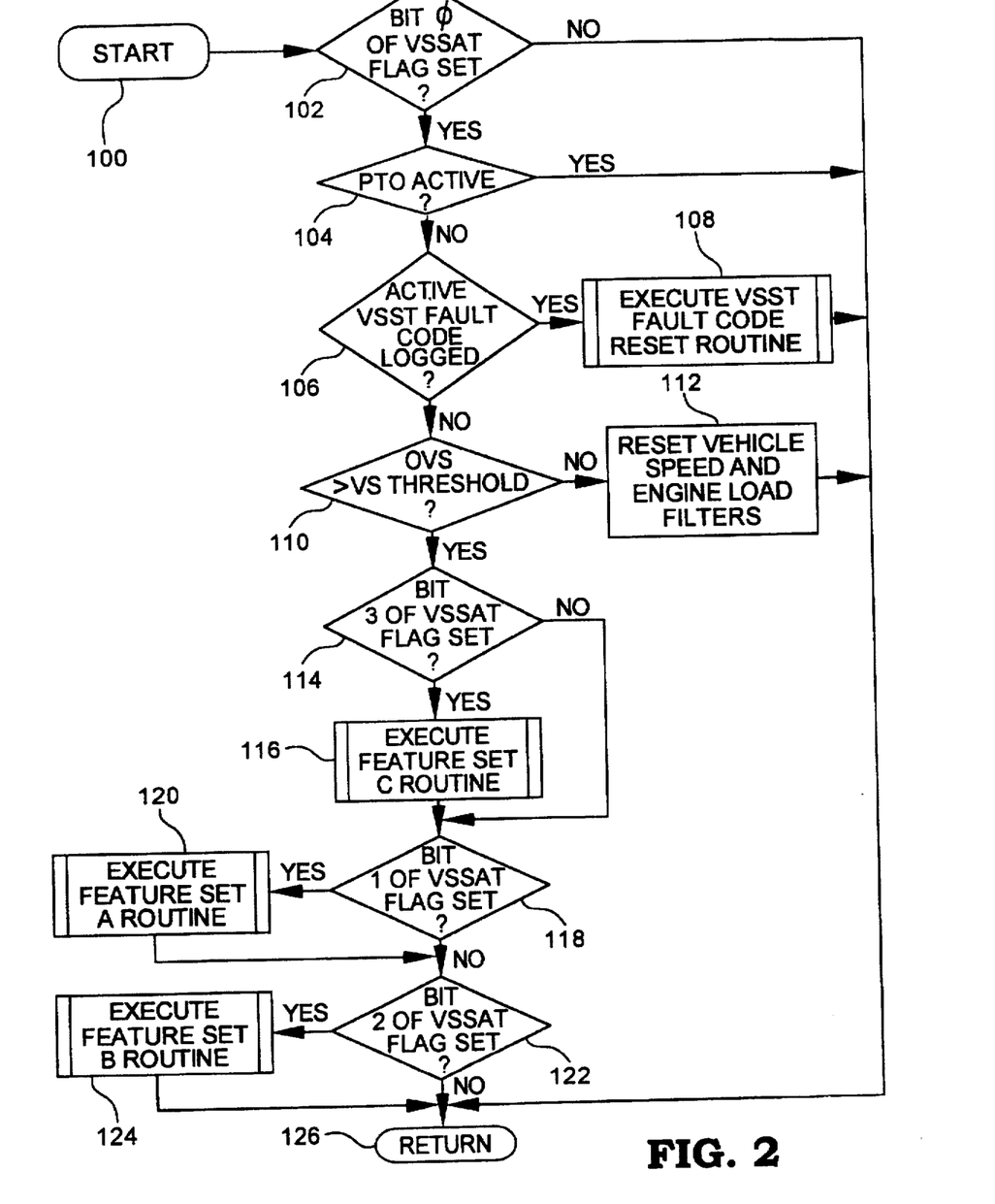
FIG. 2 is a flowchart of a vehicle speed signal tampering detection software algorithm executable by a controller of the vehicle speed signal tampering detection system of FIG. 1.

With the aid of the flowcharts of FIGS. 2–6, the operation of system 10 in implementing the concepts of the present invention will now be described in detail. Referring now to FIG. 2, a vehicle speed signal tampering detection software program is shown. The algorithm begins at step 100 and at step 102 bit 0 of the vehicle speed signal anti-tampering flag (VSSAT) is tested. If bit 0 of the VSSAT flag is detected as being set at step 102, program execution continues at step 104. If, at step 102, bit 0 of the VSSAT flag is not detected as being set, then the vehicle speed signal tampering detection algorithm is not enabled and the algorithm advances to step 126 to return program control to its calling routine. At step 104, the status of the PTO is tested to determine whether the engine is currently under control of the PTO. If so, the algorithm advances to step 126. If the engine in not currently under control of the PTO, program execution continues at step 106 where a VSST fault code location within memory is tested to determine whether an active VSST fault code has been logged therein. If an active VSST fault code is detected at step 106, the algorithm advances to step 108 to call the VSST fault code reset subroutine (discussed hereinafter). After returning from the VSST fault code reset subroutine, program execution advances to step 126. If an active VSST fault code is not detected at step 106, program execution continues at step 110.

At step 110, the observed vehicle speed (OVS), sensed by vehicle speed sensor 14, is tested against a vehicle speed (VS) threshold value. Preferably, the VS threshold value is set at approximately 2 mph, although the present invention contemplates VS threshold values of between approximately 0 and 100 mph. If OVS is less than or equal to VS threshold at step 110, then the engine speed and engine load filters are reset at step 112.

Feature set A and B subroutines each use filtered engine speed and filtered engine load values in determining possible tampering conditions. The filtered values are preferably produced by using a standard first-order filter commonly known and used in the automotive and heavy duty truck industry. Generally, the first order filter behaves in accordance with the equation: Filter Output Value=(input*filter gain)+(previous filter output*filter time constant), where filter time constant=exp(-t/tau), filter gain=(1-filter time constant), tau is a value set in accordance with the Feature Set subroutine being used as will be discussed in greater detail hereinafter and t=iteration rate of the algorithm, which is preferably 100 milliseconds as previously indicated. However, the present invention contemplates algorithm iteration rates of between approximately 1 millisecond and 1 second. Preferably, only the Filter Output Values used in Feature Set B are reset at step 112 by setting the present Filter Output Values equal to zero. However, the present invention contemplates that the Feature Set A Filter Output Values may also be reset in like manner at step 112. After the Filter Output Values are reset at step 112, the algorithm advances to step 126.

If VS is greater than VS threshold at step 110, the algorithm continues at step 114 where the status of bit 3 of the VSSAT flag is tested. If bit 3 of the VSSAT flag is found to be set at step 114, program execution advances to step 116 to call the Feature Set C subroutine. If bit 3 of the VSSAT flag is not detected as being set at step 114, or after the Feature Set C subroutine returns to the calling program, program execution continues at step 118. At step 118, bit 1 of the VSSAT flag is tested. If at step 118, bit 1 of the VSSAT flag is set, program execution advances to step 120 to call the Feature Set A subroutine. If bit 1 of the VSSAT flag is not detected as being set at step 118, or after the Feature Set A subroutine returns to the calling routine, program execution continues at step 122. At step 122, bit 2 of the VSSAT flag is tested. If at step 122, bit 2 of the VSSAT flag is set, program execution advances to step 124 to call the Feature Set B subroutine. If bit 2 of the VSSAT flag is not detected as being set at step 122, or after the Feature Set B subroutine returns to the calling routine, the algorithm advances to step 126 where program control is returned to its calling routine. It is to be understood that the algorithm described above represents only a preferred technique of enabling the algorithm and/or each of the subroutines therein, and that the present invention contemplates utilizing other known software techniques for providing the algorithm and/or subroutine enabling functions.

From the foregoing, it is apparent that in order for any of the Feature Set subroutines to be executed, certain enabling conditions must be met. Namely, bit 0 of the VSSAT flag must be set, the current vehicle speed must be greater than a vehicle speed threshold value, PTO must not be actively controlling the engine, and an active VSST fault code must not be logged.

Figure 3:
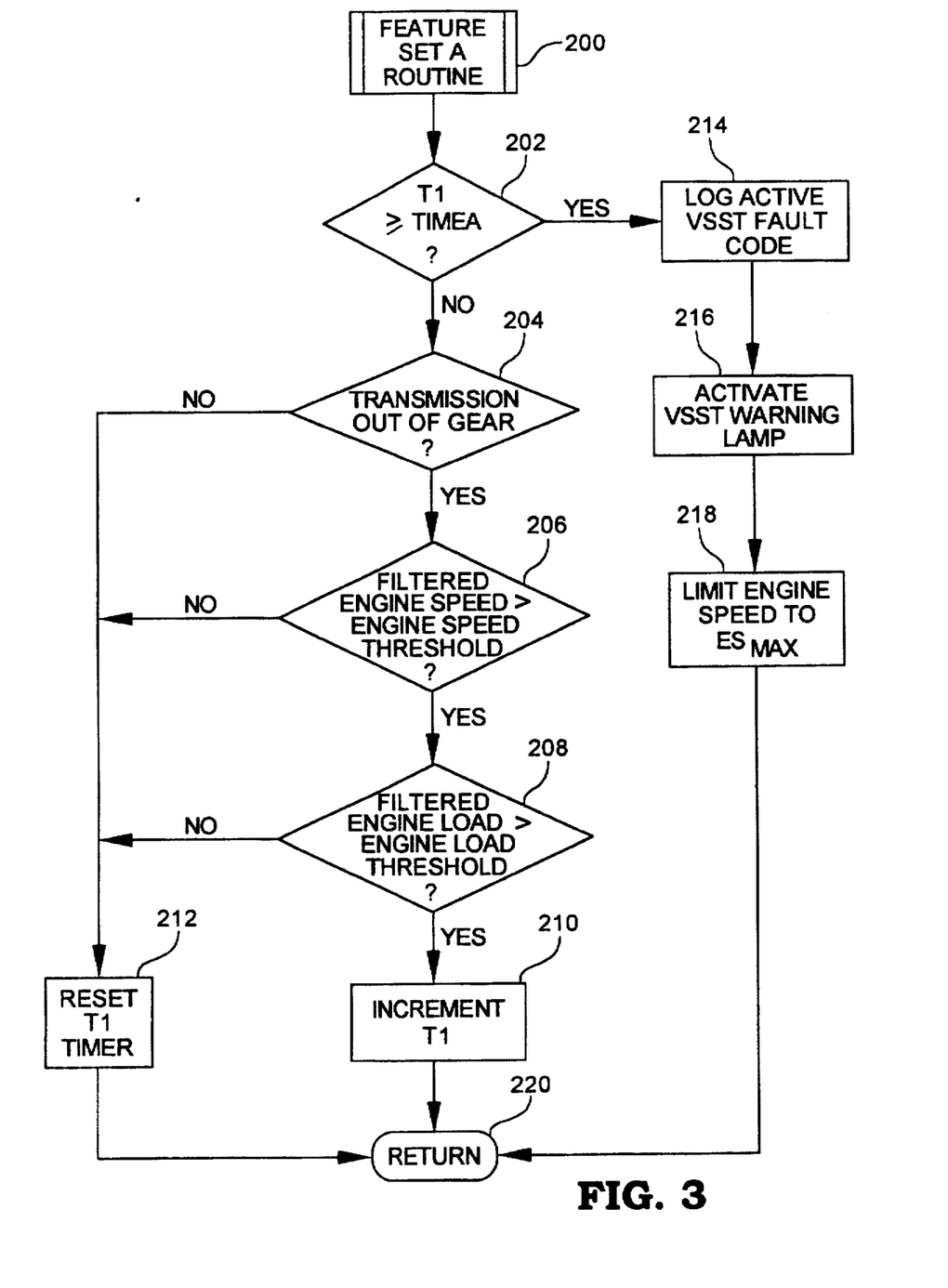
FIG. 3 is a flowchart of an optional software subroutine executable by the software algorithm of FIG. 2.

Referring now to FIG. 3, the Feature Set A subroutine will now be described in detail. The subroutine begins at step 200 and at step 202, a timer T1 is compared to a timer threshold value TIMEA. Preferably, TIMEA is set between approximately 15 to 20 seconds, although the present invention contemplates TIMEA values of between approximately 0 and 255 seconds. If T1 is greater than or equal to TIMEA at step 202, subroutine execution continues at step 214. If, however, T1 is less than TIMEA at step 202, subroutine execution continues at step 204 where the transmission status is tested. If the transmission is out of gear at step 204, subroutine execution continues at step 206. If, however, the transmission is not detected as being out of gear at step 206, subroutine execution continues at step 212 where the T1 timer is reset (set to zero).

Several techniques are known for detecting whether a transmission is out of gear. One such known software technique, which is a preferred technique for use in step 204, involves comparing vehicle speed to engine speed. If the observed difference in gear ratio indicates that a gear shift has occurred, then a shift timer is set to a predefined settling time. If the shift timer, in step 204, has not yet decremented to below a specified time limit, then the transmission is considered to be out of gear. Typically, the predefined settling time is set at approximately 40 seconds, and the specified time limit is set at approximately 38 seconds. It should be pointed out that the present invention contemplates using any known method of determining such an out-of-gear condition.

At step 206, a filtered engine speed, computed by controller 12 from the engine speed sensor 16 (FIG. 1), is compared to an engine speed threshold value. Preferably, the engine speed threshold value is calculated as the engine speed while operating in the top gear of the transmission and at the maximum road speed limit permitted by the PID portion (road speed governor) of the controller 12. Typically, the engine speed threshold is set at approximately 1,600 RPM, although the present invention contemplates using engine speed threshold values of between approximately 0 and 3,000 RPM. If the filtered engine speed at step 206 is greater than the engine speed threshold, then subroutine execution continues at step 208. If, however, the filtered engine speed at step 206 is less than or equal to the engine speed threshold value, then subroutine execution advances to step 212 where the T1 timer is reset.

At step 208, a filtered engine load value, computed by conventional means, is compared to an engine load threshold value. Preferably, an engine load threshold value of approximately 25% is used in step 208, although the present invention contemplates using engine load threshold values of between approximately 0 and 128. If the filtered engine load value is greater than the engine load threshold value at step 208, subroutine execution continues at step 210 where the T1 timer is incremented. If, at step 208, the filtered engine load value is less than or equal to the engine load threshold value, then subroutine execution advances to step 212 where the T1 timer is reset. It should be noted that the purpose of the filter in the Feature Set A subroutine is to eliminate sudden changes in the observed parameters. As such, the variable tau for the filter used in Feature set A to provide both filtered engine speed and filtered engine load was determined experimentally to provide satisfactory results with a value of 15 seconds. However, it will be recognized by those skilled in the art that other values of tau may be used as dictated by the particular application.

If, at step 202, the T1 timer has exceeded TIMEA, subroutine execution continues at step 214 where an active VSST fault code is logged into the memory portion of controller 12. Subroutine execution continues thereafter at step 216 where the VSST warning lamp 24 (FIG. 1) is activated. Subroutine execution continues thereafter at step 218 where the engine speed is limited to a programmable maximum engine speed $ES_{MAX}$. Preferably, $ES_{MAX}$ is programmed by the vehicle owner or manager, and requires some type of security clearance to do so. In any event, $ES_{MAX}$ is generally not intended to be accessible by the vehicle operator. From any of steps 210, 212 or 218, subroutine execution continues at step 220 where the subroutine is returned to its calling routine.

From the foregoing, a vehicle speed signal tampering fault will be activated by the Feature Set A subroutine if bit 1 of the VSSAT flag has been set, a transmission out-of-gear condition is detected, the filtered engine speed is greater than an engine speed threshold value and the filtered engine load is greater than an engine load threshold value, and if all of the foregoing conditions have been true for at least a time duration of TIMEA. It should be noted that the Feature Set A is intended to detect the out-of-gear tampering mode as set forth in the background section.

Figure 4:
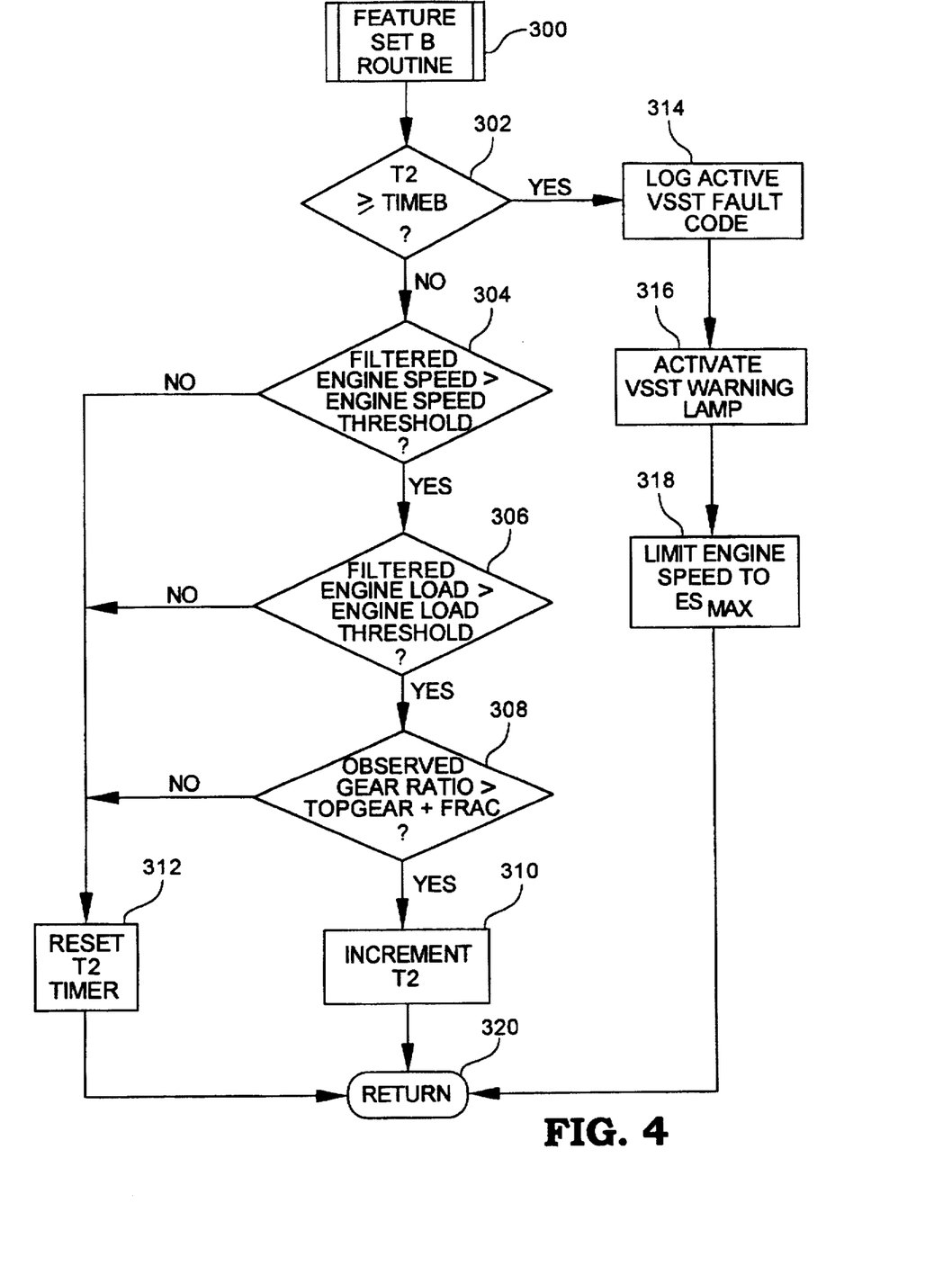
FIG. 4 is a flowchart of another optional software subroutine executable by the software algorithm of FIG. 2.

Referring now to FIG. 4, the Feature Set B subroutine will now be described in detail. Subroutine execution begins at step 300, and at step 302, a timer T2 is compared to a timer threshold TIMEB. Preferably, TIMEB is set at between approximately 15 and 20 minutes, although the present invention contemplated using TIMEB values of between approximately 0 and 255 minutes. If the T2 timer is greater than or equal to TIMEB at step 302, subroutine execution continues at step 314. If, however, the timer T2 is less than TIMEB at step 302, subroutine execution continues at step 304. At step 304, the filtered engine speed is compared to an engine speed threshold value as previously discussed. If, the filtered engine speed at step 304 is greater than the engine speed threshold value, then subroutine execution continues at step 306. If, however, the filtered engine speed at step 304 is less than or equal to the engine speed threshold value, then subroutine execution advances to step 312 where the T2 timer is reset.

At step 306, the filtered engine load value is compared to an engine load threshold value as previously discussed. If, at step 306, the filtered engine load is greater than the engine load threshold value, then subroutine execution continues at step 308. If, however, the filtered engine load at step 306 is less than or equal to the engine load threshold value, then subroutine execution advances to step 312 where the T2 timer is reset.

At step 308, the observed gear ratio is compared to a quantity (TOPGEAR+FRAC). Preferably, the observed gear ratio is determined via a ratio of engine speed to vehicle speed as is commonly known in the automotive and heavy duty truck industry. The variable TOPGEAR is the top gear ratio of the transmission, and is a calibratible quantity depending upon the type of transmission being used. The quantity FRAC is a fraction of the top gear ratio and is preferably set at approximately 5% of TOPGEAR, although the present invention contemplates using FRAC values of between approximately 0 and 100% of TOPGEAR. If the observed gear ratio at step 308 is greater than (TOPGEAR+FRAC), then subroutine execution continues at step 310 where the T2 timer is incremented. If, at step 308, the observed gear ratio is less than or equal to (TOPGEAR+FRAC), then subroutine execution advances to step 312 where the T2 timer is reset. It should be noted that the purpose of the filter in the Feature Set B subroutine is to indicate the operating trend of the various parameters. As such, the variable tau for the filter used in Feature set B to provide both filtered engine speed and filtered engine load was determined experimentally to provide satisfactory results with a value of 2 minutes. However, it will be recognized by those skilled in the art that other values of tau may be used as dictated by the particular application.

If, at step 302, the T2 timer has exceeded TIMEB, subroutine execution continues at step 314 where a VSST fault code is logged into the memory portion of controller 12. Subroutine execution continues thereafter at step 316 where the VSST warning lamp 24 (FIG. 1) is activated. Subroutine execution continues thereafter at step 318 where the engine speed is limited to a programmable maximum engine speed $ES_{MAX}$ as previously discussed. From any of steps 310, 312 or 318, subroutine execution continues at step 320 where the subroutine is returned to its calling routine.

From the foregoing, a vehicle speed signal tampering fault will be activated by the Feature Set B subroutine if bit 2 of the VSSAT flag has been set, the filtered engine speed is greater than an engine speed threshold value, the filtered engine load is greater than an engine load threshold value and the observed gear ratio is greater than the quantity (TOPGEAR+FRAC), and if all of the foregoing conditions have been true for at least a time duration of TIMEB. It should be noted that the Feature Set B subroutine is intended to detect a tampering mode wherein controller 12 is kept from sensing the programmed top gear ratio (TOPGEAR) as set forth in the background section.

Figure 5:
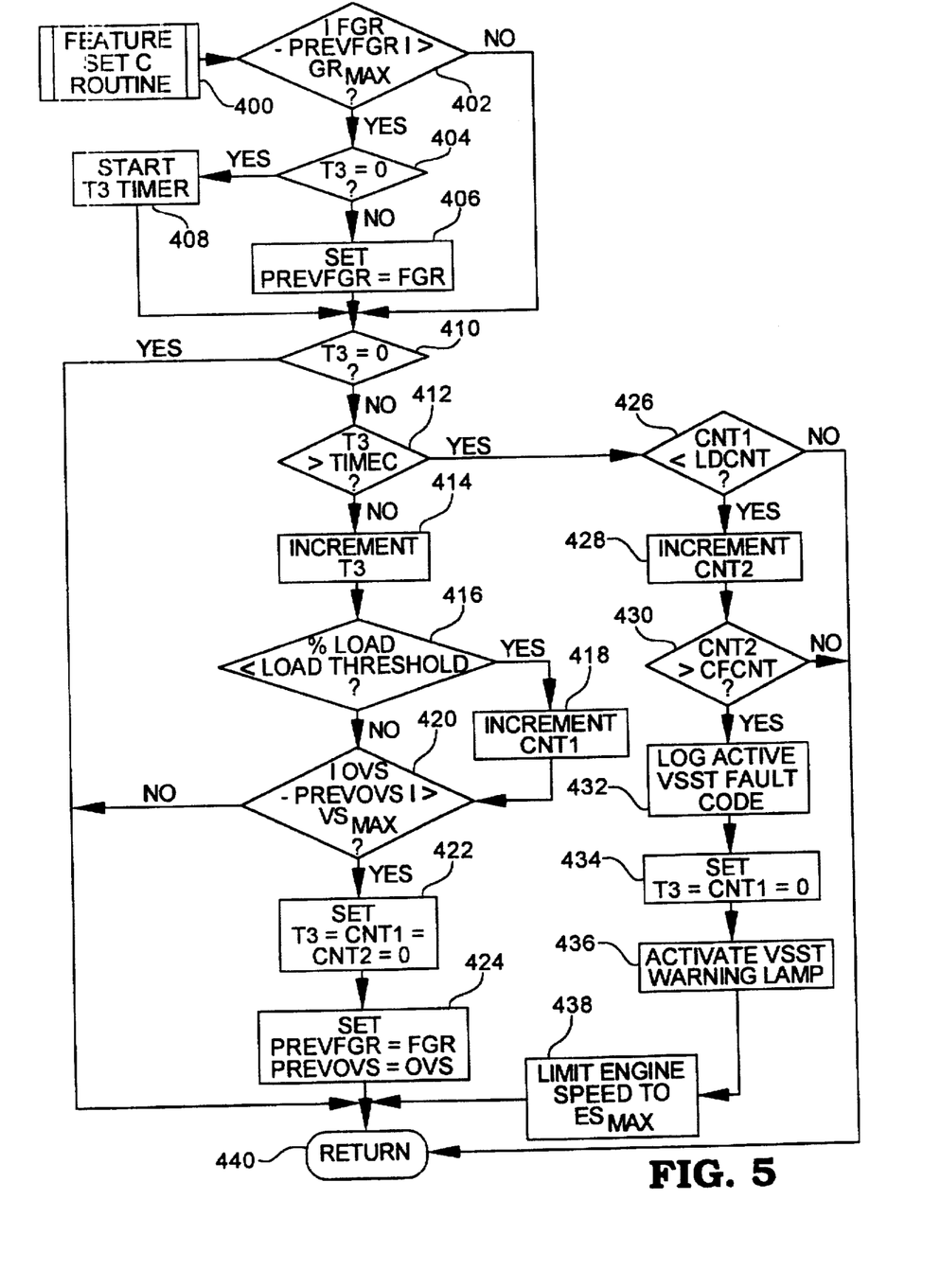
FIG. 5 is a flowchart of a further optional software subroutine executable by the software algorithm of FIG. 2.

Referring now to FIG. 5, the Feature Set C subroutine will now be described in detail. Subroutine execution begins at step 400, and at step 402, the present filtered gear ratio (FGR) is compared to the filtered gear ratio observed during the previous execution of the Feature Set C subroutine (PREVFGR). The filtered gear ratio of step 402 is computed in accordance with techniques commonly known in the automotive industry, such as by computing a ratio of engine speed to vehicle speed. In any event, if |FGR−PREVFGR| is greater than a maximum gear ratio ($GR_{MAX}$) at step 402, then subroutine execution continues at step 404. If |FGR−PREVFGR| is less than or equal to $GR_{MAX}$ at step 402, then subroutine execution continues at step 410. Preferably, $GR_{MAX}$ is set at 0.02, although the present invention contemplates using $GR_{MAX}$ values of between approximately 0 and 2.55. At step 404, the status of timer T3 is tested. If timer T3 is equal to zero at step 404, subroutine execution advances to step 408 where the T3 timer is started. Subroutine execution continues thereafter at step 410. If, at step 404, the T3 timer is not equal to zero, subroutine execution advances to step 406 where PREVFGR is set to FGR. Subroutine execution continues thereafter at step 410.

At step 410, the T3 timer is again tested. If the T3 timer is equal to zero at step 410, subroutine execution advances to step 440 where the program flow returns to the Feature Set C calling routine. If, at step 410, the T3 timer is not equal to zero, subroutine execution continues at step 412 where the T3 timer is compared to a timer threshold TIMEC. Preferably, TIMEC is set at 12 seconds, although the present invention contemplates using TIMEC values of between approximately 0 and 255 seconds. If, at step 412, the timer T3 is greater than TIMEC, subroutine execution continues at step 426. If, however, the timer T3 is less than or equal to TIMEC at step 412, subroutine execution advances to step 414 where the T3 timer is incremented. Subroutine execution continues thereafter at step 416 where the percent engine load, determined via known means, is tested against an engine load threshold. Preferably, the engine load threshold is set at 10%, although the present invention contemplates using engine load threshold values of between approximately 0 and 128%. If, at step 416, the percent engine load is less than the engine load threshold, a counter CNT1 is incremented at step 418. If, at step 416, the percent engine load is greater than or equal to the engine load threshold, or if CNT1 is incremented at step 418, subroutine execution continues at step 420. At step 420, the present observed vehicle speed (OVS), sensed via vehicle speed sensor 14 (FIG. 1), is compared with the observed vehicle speed observed during the previous execution of Feature Set C (PREVOVS). If, at step 420, |OVS−PREVOVS| is greater than a calibratible maximum vehicle speed difference ($VS_{MAX}$), then subroutine execution continues at step 422. If, however, |OVS−PREVOVS| is less than or equal to $VS_{MAX}$ at step 420, subroutine execution advances to step 442 where the Feature Set C subroutine is returned to its calling routine. Preferably, $VS_{MAX}$ is set at 2 mph, although the present invention contemplates $VS_{MAX}$ values of between approximately 0 and 100 mph.

At step 422, the timer T3 and the counters CNT1 and CNT2 are set to zero. Thereafter, at step 424, PREVFGR is set to FGR and PREVOVS is set to OVS. Thereafter, at step 442, the Feature Set C subroutine is returned to its calling routine.

At step 426, the counter CNT1 is compared with a load count value (LDCNT). Preferably, LDCNT is set at 8, although the present invention contemplates load count values of between approximately 0 and 255. If, at step 426, CNT1 is less than LDCNT, subroutine execution continues at step 428. If, however, CNT1 is greater than or equal to LDCNT at step 426, subroutine execution continues at step 434. At step 428, the counter CNT2 is incremented and thereafter at step 430, CNT2 is compared with a consecutive fault count value (CFCNT). Preferably, CFCNT is set at 10, although the present invention contemplates using CFCNT values of between approximately 0 and 255. If, at step 430, CNT2 is less than CFCNT, then subroutine execution advances to step 440 where the Feature Set C subroutine is returned to its calling routine. If, however, CNT2 is greater than or equal to CFCNT at step 430, a VSST fault code is logged into memory at step 432. Thereafter at step 434, the timer T3 and counter CNT1 are both set to zero.

Subroutine execution continues from step 434 at step 436 where the VSST warning lamp 24 (FIG. 1) is activated. Subroutine execution continues from step 436 at step 438 where the engine speed is limited to a programmable maximum engine speed $ES_{MAX}$ as previously discussed. Thereafter, subroutine execution continues at step 440 where the Feature Set C subroutine is returned to its calling routine.

From the foregoing, a vehicle speed signal tampering fault will be activated by the Feature Set C subroutine if bit 3 of the VSSAT flag has been set and the filtered gear ratio changes by more than $GR_{MAX}$, both for a calibratible number of consecutive events CFCNT. In addition, the observed vehicle speed must not change by more than $VS_{MAX}$ and the percent engine load must be below the engine load threshold for less than a calibratible number of consecutive counts LDCNT, each within a calibratible amount of time TIMEC after the change in gear ratio, as set forth above, is detected. It should be noted that the Feature Set C subroutine is intended to detect a tampering mode wherein controller 12 is provided with an artificial speed so that it is kept from sensing the programmed maximum vehicle speed ($VS_{MAX}$) as set forth in the background section.

Figure 6:
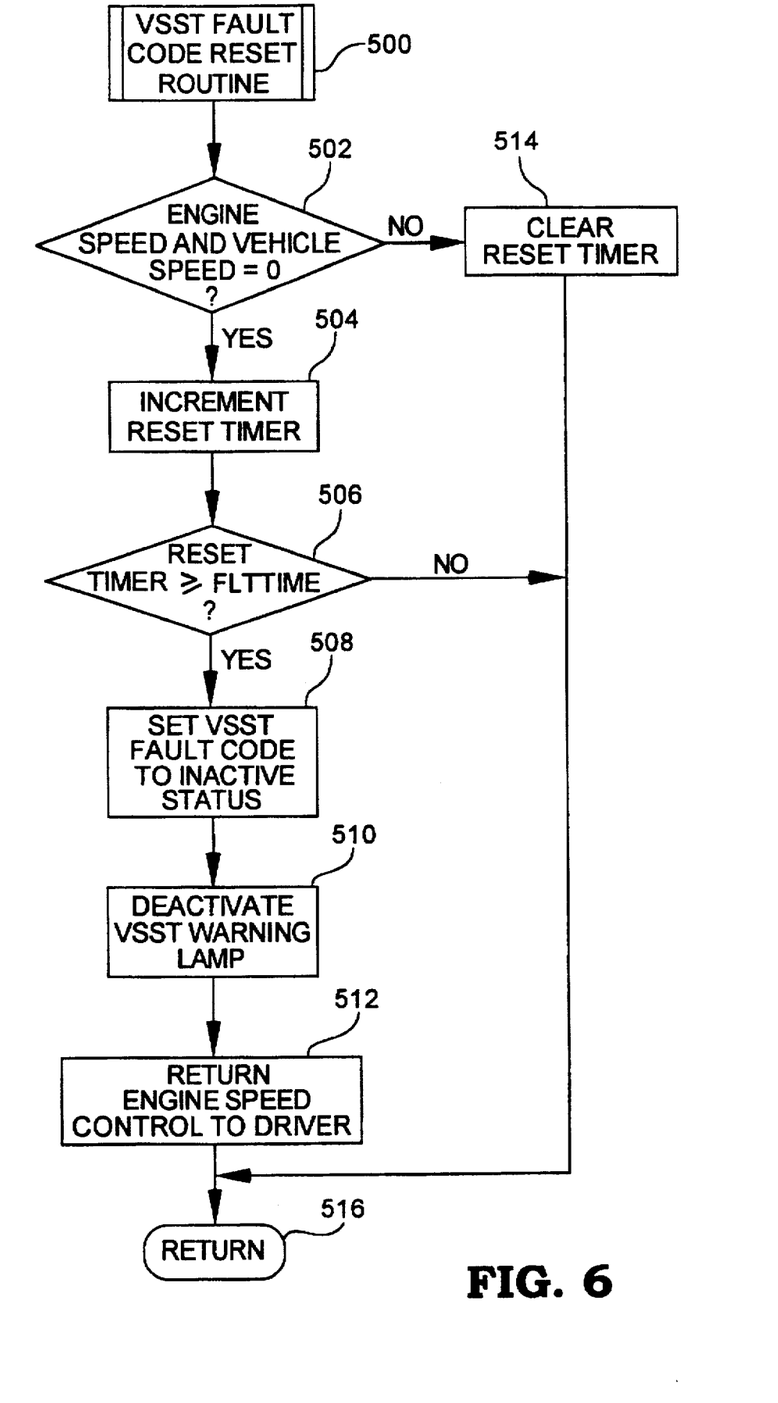
FIG. 6 is a flowchart of a vehicle speed signal tampering reset subroutine executable by the software algorithm of FIG. 2.

Referring now to FIG. 6, the VSST Fault Code Reset subroutine will now be described in detail. The subroutine begins at step 500, and at step 502, the present engine speed and vehicle speed values are tested. If, at step 502, both of the engine speed and vehicle speed values are equal to zero (vehicle stopped and engine off), subroutine execution continues at step 504. If both of the engine speed and vehicle speed are not equal to zero at step 502, subroutine execution advances to step 514 where the reset timer is cleared.

At step 504, the reset timer is incremented and thereafter at step 506, the reset timer is tested against a fault code time threshold FLTTIME. FLTTIME is preferably set at approximately 30 seconds, although the present invention contemplates using FLTTIME values of between approximately 0 and 255 seconds. If the reset timer has advanced to a value of greater than or equal to FLTTIME at step 506, the active VSST fault code is changed to an inactive state at step 508. If, at step 506, the reset timer is less than FLTTIME, subroutine execution advances to step 516 where the VSST Fault Code Reset subroutine returns to its calling routine.

Subroutine execution continues from step 508 at step 510 where the VSST warning lamp 24 is deactivated. Thereafter at step 512, the engine speed limit of $ES_{MAX}$ established in one of the Feature Set subroutines A, B or C is removed and engine speed control is returned to the vehicle operator. Subroutine execution continues from step 512 at step 516 where program execution is returned to the calling routine.

A VSST fault code, once logged in memory, is thus cleared from memory when the reset timer reaches a calibratible threshold (FLTTIME) after the vehicle comes to a stop, the engine is shut down and the key switch is thereafter turned on to thereby power controller 12 and start the reset timer. During the time that the reset timer is incrementing toward FLTTIME, however, vehicle speed and engine speed must remain at zero. Otherwise, the reset timer will be cleared and the above process must be repeated to deactivate the VSST fault code. It should be pointed out that a deactivated, or inactive, VSST fault code may only be accessed and reset by service personnel.

A further feature of the present invention permits a vehicle owner or manager to select which, if any, Feature Set subroutines to be executed by the main program of FIG. 2. Through the use of a service tool (not shown), as known in the automotive and heavy duty truck industry, the vehicle owner/manager may select various ones of the Feature Set subroutines to be executed. A preferred arrangement for offering Feature Set options to the vehicle owner/manager is to prompt, through the use of the service tool, the owner/manager to select the type of transmission (manual or automatic) and intended vehicle use (on highway or on/off highway). Based on the transmission information, the service tool will enable or disable the appropriate ones of the Feature Set subroutines by setting appropriate bits of the VSSAT flag discussed above. Preferably, the service tool is further used to prompt the owner/manager to program values for the variables $ES_{MAX}$ and TOPGEAR.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of controlling engine speed in response to detection of vehicle speed signal tampering in a vehicle having an engine, a transmission having a plurality of gears, a vehicle speed sensor for sensing vehicle speed and providing a vehicle speed signal corresponding thereto, an engine speed sensor for sensing engine speed and providing an engine speed signal corresponding thereto, and an electronic engine controller having a memory associated therewith, the method comprising the steps of:

(1) monitoring the vehicle speed signal and the engine speed signal and determining therefrom whether a constant transmission out of gear condition exists;

(2) determining that a vehicle speed signal tampering condition exists and logging an active vehicle speed signal fault code within the memory if said constant out of gear condition exists for at least a first time period; and (3) electronically controlling the engine speed to a predefined maximum engine speed in response to logging said active vehicle speed signal fault code.

2. The method of claim 1 further including the following step after step (1) but prior to the execution of step (2):

comparing the engine speed signal with an engine speed threshold value;

and wherein step (2) is further conditioned upon the engine speed signal exceeding said engine speed threshold value for at least said first time period.

3. The method of claim 2 wherein the electronic engine controller provides an engine fueling signal to an engine fueling system, and wherein the method further includes the following steps after step (1) but prior to the execution of step (2):

determining an engine load value from the engine fueling and engine speed signals;

comparing said engine load value with an engine load threshold value;

and wherein step (2) is further conditioned upon said engine load exceeding said engine load threshold value for at least said first time period.

4. The method of claim 1 further including the following step:

(4) activating a warning lamp in response to logging said active vehicle speed signal fault code.

5. The method of claim 1 wherein the transmission is a manual transmission.

6. The method of claim 1 wherein execution of steps (1)–(3) is conditioned upon said vehicle speed signal fault code not having an active status.

7. The method of claim 6 further including the following steps:

(4) performing steps (5)–(7) if said vehicle speed signal fault code has an active status;

(5) changing said active vehicle speed signal fault code to an inactive state;

(6) deactivating said warning lamp; and (7) returning engine speed control to an operator of the vehicle.

8. The method of claim 7 wherein step (4) is further conditioned upon each of said engine and vehicle speed signals being approximately zero for a second time period.

9. The method of claim 6 wherein the controller includes a power take off portion for controlling engine speed under predetermined conditions;

and wherein execution of steps (1)–(3) is further conditioned upon said engine speed not being controlled by the power take off portion of the controller.

10. The method of claim 9 including the following step prior to the execution of step (1):

sensing said vehicle speed;

and wherein execution of steps (1)–(3) is further conditioned upon said vehicle speed being greater than a vehicle speed threshold value.

11. A method of controlling engine speed in response to defection of vehicle speed signal tampering in a vehicle having an engine, a transmission having a plurality of gears, a vehicle speed sensor for sensing vehicle speed and providing a vehicle speed signal corresponding thereto, an engine speed sensor for sensing engine speed and providing an engine speed signal corresponding thereto, and an electronic engine controller having a memory associated therewith, the method comprising the steps of:

(1) monitoring the vehicle speed signal and the engine speed signal and determining therefrom a transmission gear ratio;

(2) determining that a vehicle speed signal tampering condition exists and logging an active vehicle speed signal fault code within the memory if said transmission gear ratio exceeds a predefined top gear ratio by at least a predetermined percentage of said predefined top gear ratio for a first time period; and (3) electronically controlling the engine speed to a predefined maximum engine speed in response to logging said active vehicle speed signal fault code.

12. The method of claim 11 further including the following step after step (1) but prior to the execution of step (2):

comparing the engine speed signal with an engine speed threshold value;

and wherein step (2) is further conditioned upon the engine speed signal exceeding said engine speed threshold value for at least said first time period.

13. The method of claim 12 wherein the electronic engine controller provides an engine fueling signal to an engine fueling system, and wherein the method further includes the following steps after step (1) but prior to the execution of step (2):

determining an engine load value from the engine fueling and engine speed signals;

comparing said engine load value with an engine load threshold value;

and wherein step (2) is further conditioned upon said engine load exceeding said engine load threshold value for at least said first time period.

14. The method of claim 11 further including the following step:

(4) activating a warning lamp in response to logging said active vehicle speed signal fault code.

15. The method of claim 13 wherein the transmission is one of an automatic transmission and a manual transmission, wherein the manual transmission is operable to provide the vehicle with a strictly on-highway application.

16. The method of claim 11 wherein execution of steps (1)–(3) is conditioned upon said vehicle speed signal fault code not having an active status.

17. The method of claim 16 further including the following steps:

(4) performing steps (5)–(7) if said vehicle speed signal fault code has an active status;

(5) changing said active vehicle speed signal fault code to an inactive state;

(6) deactivating said warning lamp; and (7) returning engine speed control to an operator of the vehicle.

18. The method of claim 17 wherein step (4) is further conditioned upon each of said engine and vehicle speed signals being approximately zero for a second time period.

19. The method of claim 16 wherein the controller includes a power take off portion for controlling engine speed under predetermined conditions;

and wherein execution of steps (1)–(3) is further conditioned upon said engine speed not being controlled by the power take off portion of the controller.

20. The method of claim 19 including the following step prior to the execution of step (1):

sensing said vehicle speed;

and wherein execution of steps (1)–(3) is further conditioned upon said vehicle speed being greater than a vehicle speed threshold value.

21. A method of controlling engine speed in response to detection of vehicle speed signal tampering in a vehicle having an engine, a transmission having a plurality of gears, a vehicle speed sensor for sensing vehicle speed and providing a vehicle speed signal corresponding thereto, an engine speed sensor for sensing engine speed and providing an engine speed signal corresponding thereto, and an electronic engine controller having a memory associated therewith, the method comprising the steps of;

(1) periodically sensing the vehicle and engine speed signals and determining therefrom a transmission gear ratio;

(2) comparing said transmission gear ratio with the previously determined transmission gear ratio;

(3) comparing the vehicle speed signal with the previously sensed vehicle speed signal;

(4) determining that a vehicle speed signal hampering condition exists and logging an active vehicle speed signal fault code within the memory if, for at least a first time period, the transmission gear ratio deviates from the previously determined transmission gear ratio by more than a gear ratio threshold value and the vehicle speed signal does not deviate from the previously sensed vehicle speed signal by more than a vehicle speed threshold value; and (5) electronically controlling the engine speed to a predefined maximum engine speed in response to logging said active vehicle speed signal fault code.

22. The method of claim 21 wherein the electronic engine controller provides an engine fueling signal to an engine fueling system, and wherein the method further includes the following steps after step (1) but prior to the execution of step (2):

determining an engine load percentage from the engine fueling and engine speed signals;

comparing said engine load percentage with an engine load threshold percentage;

and wherein step (2) is further conditioned upon said engine load percentage being less than said engine load threshold percentage for less than a second time period within said first time period.

23. The method of claim 22 wherein step (4) is further conditioned upon a third time period elapsing after said first time period has expired.

24. The method of claim 21 further including the following step:

(6) activating a warning lamp in response to logging said vehicle speed signal fault code.

25. The method of claim 21 wherein the transmission is a manual transmission.

26. The method of claim 21 wherein execution of steps (1)–(5) is conditioned upon said vehicle speed signal fault code not having an active status.

27. The method of claim 24 further including the following steps:

(6) performing steps (7)–(9) if said vehicle speed signal fault code has an active status;

(7) changing said active vehicle speed signal fault code to an inactive state;

(8) deactivating said warning lamp; and (9) returning engine speed control to an operator of the vehicle.

28. The method of claim 27 wherein step (6) is further conditioned upon each of said engine and vehicle speed signals being approximately zero for a second time period.

29. The method of claim 26 wherein the controller includes a power take off portion for controlling engine speed under predetermined conditions;

and wherein execution of steps (1)–(5) is further conditioned upon said engine speed not being controlled by the power take off portion of the controller.

30. The method of claim 29 including the following step prior to the execution of step (1):

sensing said vehicle speed;

and wherein execution of steps (1)–(5) is further conditioned upon said vehicle speed being greater than a vehicle speed threshold value.

31. A method of controlling engine speed in response to detection of vehicle speed signal tampering in a vehicle having an engine, a transmission having a plurality of gears, a vehicle speed sensor for sensing vehicle speed and providing a vehicle speed signal corresponding thereto, an engine speed sensor for sensing engine speed and providing an engine speed signal corresponding thereto, and an electronic engine controller having a memory associated therewith, the method comprising the steps of:

(1) periodically monitoring the vehicle speed and engine speed signals;

(2) determining from the vehicle and engine speed signals whether a constant transmission out-of-gear condition exists if the transmission is a manual transmission;

(3) determining a first transmission gear ratio from the vehicle and engine speeds if the transmission is one of an automatic transmission and a particular manual transmission, wherein the particular manual transmission is operable to provide the vehicle with strictly an on-highway application;

(4) determining a second transmission gear ratio from the vehicle and engine speed signals, comparing said second transmission gear ratio with the previously determined second transmission gear ratio and comparing the vehicle speed signal with the previously sensed vehicle speed signal, if the transmission is a manual transmission:

(5) determining that a vehicle speed signal tampering condition exists and logging an active vehicle speed signal fault code within the memory if one of the constant transmission out-of-gear ratio condition exists for at least a first time period, the first transmission gear ratio exceeds a predefined top gear ratio by at least a predetermined percentage of said predefined top gear ratio for at least a second time period and, for at least a third time period, the second transmission gear ratio deviates from the previously determined second transmission gear ratio by more than a gear ratio threshold value and the vehicle speed does not deviate from the previously sensed vehicle speed by more than a vehicle speed threshold value; and (6) electronically controlling the engine speed to a predefined maximum engine speed in response to logging said active vehicle speed signal fault code.

32. The method of claim 31 further including the following step:

(7) activating a warning lamp in response to logging said active vehicle speed signal fault code.

33. The method of claim 31 wherein execution of steps (1)–(6) is conditioned upon said vehicle speed signal fault code not having an active status.

34. The method of claim 33 further including the following steps:

(7) performing steps (8)–(10) if said vehicle speed signal fault code has an active status;

(8) changing said active vehicle speed signal fault code to an inactive state;

(9) deactivating said warning lamp; and (10) returning engine speed control to an operator of the vehicle.

35. The method of claim 34 wherein step (7) is further conditioned upon each of said engine and vehicle speed signals being approximately zero for a fourth time period.

36. The method of claim 33 wherein the controller includes a power take off portion for controlling engine speed under predetermined conditions;

and wherein execution of steps (1)—(6) is further conditioned upon said engine speed not being controlled by the power take off portion of the controller.

37. The method of claim 36 including the following step prior to the execution of step (1):

sensing said vehicle speed;

and wherein execution of steps (1)—(6) is further conditioned upon said vehicle speed being greater than a vehicle speed threshold value.

\* \* \* \* \*

UNITED STATES PATENT AND TRADEMARK OFFICE
CERTIFICATE OF CORRECTION

PATENT NO : 5,706,199

DATED : January 6, 1998

INVENTOR(S) : Mark L. Wilson et al.

It is certified that error appears in the above-identified patent and that said Letters Patent is hereby corrected as shown below:

In column 7, line 44, change "current" to --observed--.
In column 10, line 64, change "442" to --440--.
In column 11, line 4, change "442" to -440--.
In column 13, line 51, change "defection to --detection--.
In column 15, line 8, change "hampering" to --tampering--.

Signed and Sealed this

Sixth Day of February, 2001

Q. TODD DICKINSON

*Attest:*

*Attesting Officer*    Director of Patents and Trademarks